United States Patent [19]

Shaw

[11] 3,907,052
[45] Sept. 23, 1975

[54] STEERING SYSTEMS FOR TRACKLAYING VEHICLES
[75] Inventor: Daniel J. C. Shaw, Elvington, England
[73] Assignee: International Harvester Company, Chicago, Ill.
[22] Filed: Mar. 21, 1974
[21] Appl. No.: 453,228

Related U.S. Application Data
[62] Division of Ser. No. 356,273, May 1, 1973, Pat. No. 3,815,631.

[30] Foreign Application Priority Data
May 4, 1972  United Kingdom............... 20703/72

[52] U.S. Cl................................. 180/6.7; 192/13 R
[51] Int. Cl.²......................................... B62D 11/08
[58] Field of Search............... 180/6.7, 6.2; 192/13 R

[56] References Cited
UNITED STATES PATENTS
2,941,639  6/1960  Christenson...................... 192/13 R
3,374,846  3/1968  Massone............................. 180/6.7

Primary Examiner—Kenneth H. Betts
Assistant Examiner—John A. Pekar
Attorney, Agent, or Firm—John W. Gaines; Floyd B. Harman

[57] ABSTRACT

A closed centre hydraulic control system for a tracklaying vehicle comprises a pair of spool valves and a pair of variable relief valves. Each spool valve controls the supply of hydraulic fluid to the clutch and brake cylinders associated with a respective one of the tracks of the vehicle and is operable in three positions: a first position in which the brake is disengaged and the clutch is engaged, a second position in which the clutch is disengaged and the brake is disengaged, and a third position in which the clutch is disengaged and the brake is fully engaged. Movement of the spool valves from the second to the third positions is effective to increase progressively the pressure at which the relief valve relieves hydraulic fluid supplied to the associated brake cylinder, so that the brakes are progressively engaged during the movement of the spool valve from the second position to the third position.

7 Claims, 6 Drawing Figures

STEERING SYSTEMS FOR TRACKLAYING VEHICLES

This is a division of application Ser. No. 356,273 filed May 1, 1973, now U.S. Pat. No. 3,815,631.

BACKGROUND OF THE INVENTION

The invention relates to track-laying vehicles and more particularly to a control assembly for the steering system of a track-laying vehicle.

Track-laying vehicles normally comprise two tracks, one on either side of the vehicle, each of which is arranged around a drive wheel and one or more idler wheels. Power is transmitted from the engine of the vehicle to a gear box, and then from the gear box along two separate transmissions to each of the drive wheels. Each of the separate transmissions from the gear box to the drive wheel includes a clutch, and also a brake on the output side of the clutch by which the drive wheel can be braked. When the vehicle is travelling straight ahead, both the clutches are engaged and both the brakes are disenaged so that body drive wheels are driven at equal rates by the engine. If it is desired to turn the vehicle, one or other of the clutches is desengaged so that the power from the engine is applied solely to one of the drive wheels whilst the other drive wheels idles. As a result, the vehicle turns in a gentle curve. If it is desired to turn the vehicle in a sharper curve, the idling drive wheel is braked. By applying a greater or smaller braking force to the idling drive wheel, the vehicle can be made to turn in a sharper or shallower curve.

SUMMARY OF THE INVENTION

It is an object of the present invention to provide a track-laying vehicle which includes a steering system operated by an hydraulic circuit of the closed-centre type.

According to the present, there is provided a track-laying vehicle comprising a pair of tracks each drivable by a respective drive wheel, a pair of clutches each for transmitting power to a respective one of the drive wheels and each operable by a respective clutch cylinder, a pair of brakes each for braking a respective one of the tracks and each operable by a respective brake cylinder, a source of fluid pressure, and a control assembly for controlling the supply of fluid to the clutch and brake cylinder, the control assembly including a pair of spools valves and a pair of variable relief valves, each spool valve controlling the supply of hydraulic fludi to the clutch and brake cylinders associated with a respective one of the tracks, each spool valve having three operating positions; a first position in which the brake is disengaged and the clutch is engaged, a second position in which the clutch is disengaged and the brake is disengaged, and a third position in which the clutch is disengaged and the brake is fully engaged, each variable relief valve being associated with one spool valve and permitting relief of hydraulic fluid supplied to a respective brake cylinder from the control assembly when the associated spool valve is in the second position, and each variable relief valve being controlled during the movement of the associated spool valve from the second to the third position to increase progressively the pressure at which the said relief of hydraulic fluid is permitted, whereby the brake is progressively engaged during movement of the spool valve from the second position to the third position.

Although the control assembly may be arranged to direct fluid to the clutch cylinder at a constant pressure when the spool valve is in the second or third position or in any position therebetween, the clutch cylinder and the brake cylinder are conveniently supplied with hydraulic fluid from the control assembly at the same pressure when the spool valve is in any of these positions. If the control system is arranged in this way, the clutch and brake cylinders controlling each track can be connected to the same outlet ports of the control assembly and separate outlet ports from the control assembly for each of the brake and clutch cylinders are not required.

The brake and clutch cylinders may be single-acting piston-and-cylinder devices the points of which are mechanically biased, for example by springs, into their normal operating positions, i.e. the positions which the cylinders occupy when the vehicle is travelling straight ahead. In the preferred embodiment of the present invention, however, each brake cylinder is a double-acting hydraulic piston-and-cylinder device one side of each piston being connected to the source of fluid pressure, the other side being connected to the control assembly. Preferably too, each clutch cylinder is a double-acting hydraulic piston-and-cylinder, both sides of the pistons of which are connected to the control assembly.

The flow of fluid in the control assembly is preferably controlled by a metering orifice when the spool valve occupies the second on third position or any position therebetween. Excessive discharge of fluid to the sump is thereby avoided.

The variable relief valve may be of any conventional form and the control of the relief valve during the movement of the spool valve associated with it from the second to the third position may be achieved by any convenient means, for example the spool valve and relief valve associated with the control of one track may be linked separately to a common control lever. Preferably, however, the variable relief valve is controlled by a compression spring, the compression of which is increased by the associated spool valve during the movement of the spool valve between the second and third positions. With such an arrangement, the variable relief valve and the spool valve can be located within the same housing. Conveniently, both the spool valves and both the variable relief valves are located in a single housing and the variable relief valves operate to direct fluid into a common return gallery in the housing.

According to a further feature of the invention, there is provided a control assembly for the steering system of a track-laying vehicle comprising a pair of spool valves and a pair of variable relief valves located within a housing having a supply port, an exhaust port and four outlet ports, two outlet ports being associated with each spool valve, each spool valve being reciprocable in the housing between a first position in which one of the associated outlet ports is connected to the supply port and the other associated outlet port is connected to the exhaust port, and second and third positions in both of which positions the said one outlet port is connected to the exhaust port, and the said other outlet port is connected with the supply port and, through a variable relief valve, with the exhaust port, movement of the spool valve from the second position to the third being effective to increase the pressure at which the variable relief valve effects communication of the said other outlet port with the exhaust port.

Preferably, each variable relief valve comprises a valve member which is biased by a compression spring into an aperture through which the communication between the said other outlet port and the exhaust port is established, the compression of the spring being increased by the spool valve associated with the relief valve during movement of the spool valve from the second to the third position.

Advantageously, the supply port can be placed in communication with the said other outlet port and, through the variable relief valve, with the exhaust port via a metering orifice.

Desirably, the variable relief valves effect communication of the said other ports with the exhaust port via a common return gallery in the housing.

BRIEF DESCRIPTION OF THE DRAWINGS

In order that the invention may be better understood, a preferred embodiment thereof will now be described, by way of example only, and with reference to the accompanying drawings, in which.

DESCRIPTION OF THE PREFERRED EMBODIMENT

Figure 1:
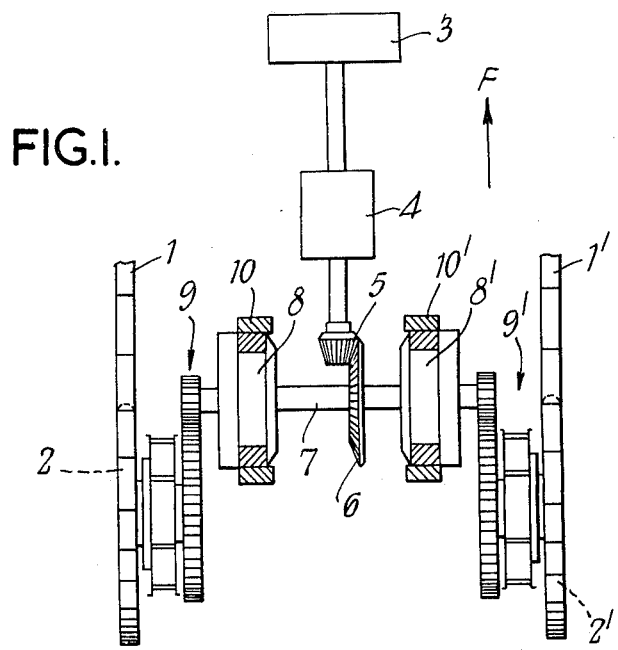
FIG. 1 is a schematic plan view of the power transmission system in a preferred track-laying vehicle in accordance with the present invention.

Referring first to FIG. 1, there is shown a schematic plan view of a preferred track-laying vehicle in accordance with the present invention. The vehicle includes a pair of tracks 1 and 1' arranged on either side of the vehicle and each drivable by a respective drive wheel 2 and 2'. Power is transmitted from an engine 3 to the drive wheels 2 and 2' through a speed selector gear box 4 in which any one of two forward gears and two reverse gears may be selected. An output from the gear box 4 carries a bevel gear 5 which engages with a further bevel gear 6 mounted on a transverse axle 7. Each end of the axle 7 carries a clutch 8 and 8' through which power is transmitted to the drive wheels 2 and 2' through a gear reduction system indicated generally at 9 and 9'. The friction plates of the clutches 8 and 8' are biased into engagement by springs (not shown). A brake band 10 and 10' surrounds each of the clutches 8 and 8' on the output side of the clutch so that application of the brake to the output side of the clutch applies a braking force to the transmission which leads to the drive wheel 2 or 2' and thereby brakes the track 1 or 1'. Each of the brakes 10 and 10' is operable by a respective brake cylinder and each of the clutches 8 and 8' is operable by a respective clutch cylinder. The clutch and brake cylinders associated with each of the tracks are illustrated schematically in FIG. 2 of the accompanying drawings, the clutch cylinders being indicated by the reference numerals 15 and 15' and the brake cylinders by the reference numerals 16 and 16'.

Figure 2:
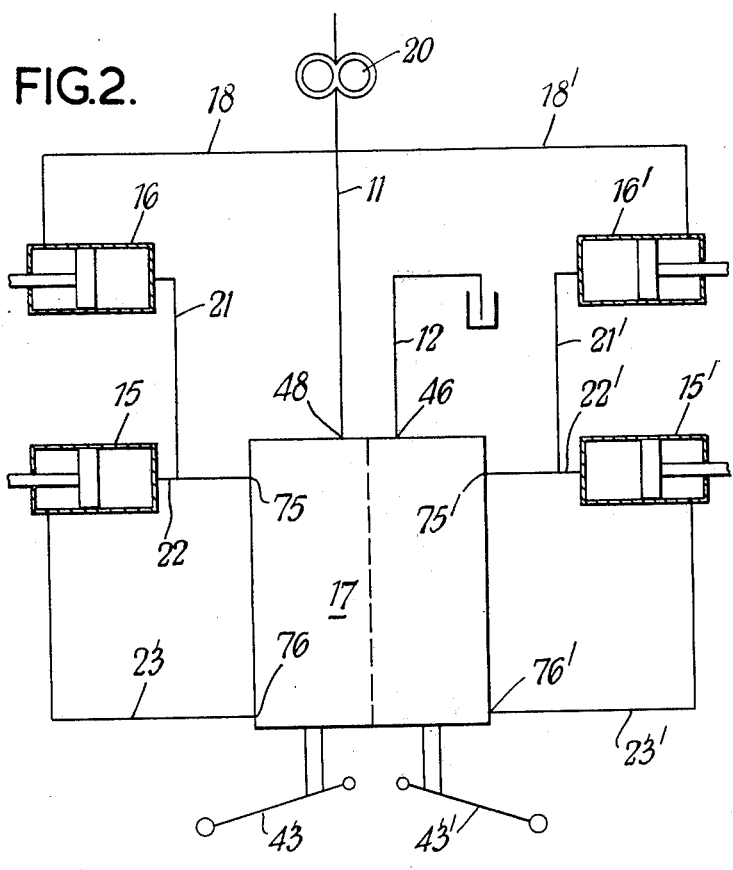
FIG. 2 is a diagram illustrating part of the hydraulic circuit incorporated in the track-laying vehicle of FIG. 1.
Figure 3:
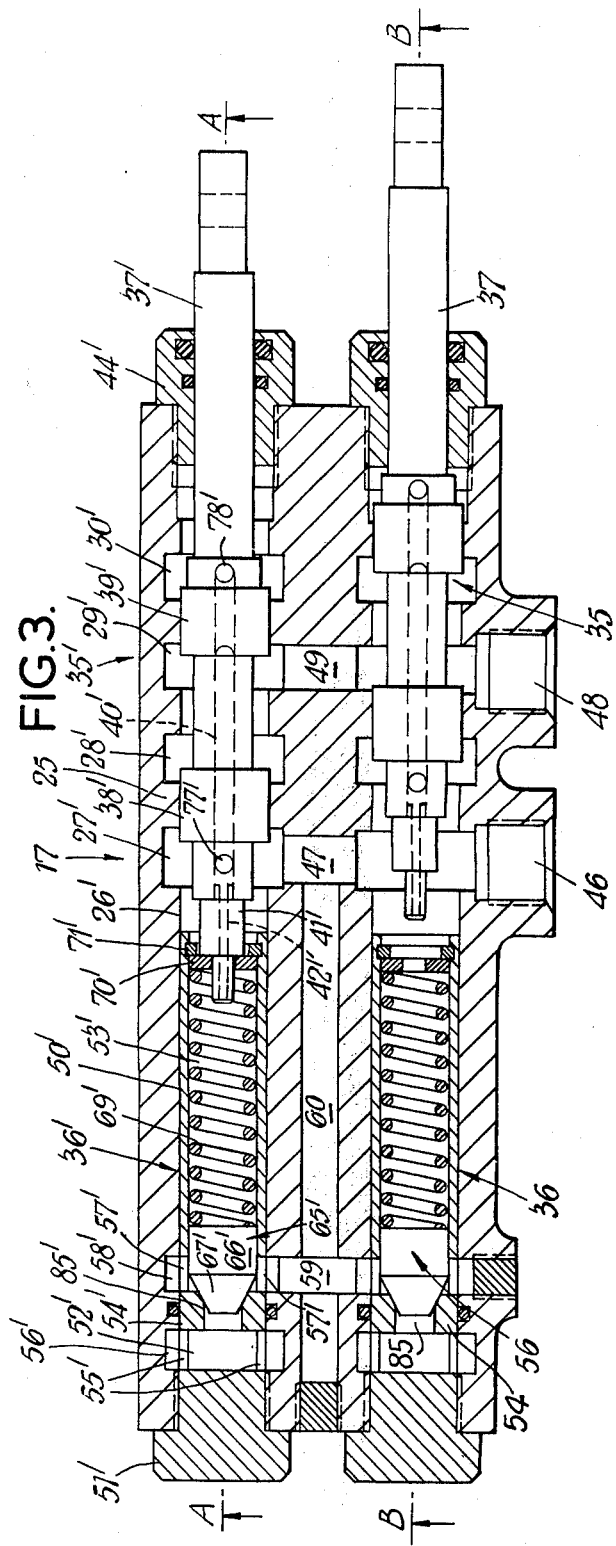
FIG. 3 is a transverse cross-section through a preferred control assembly in accordance with the present invention and used to control the transmission system illustrated in FIG. 1.
Figure 4:
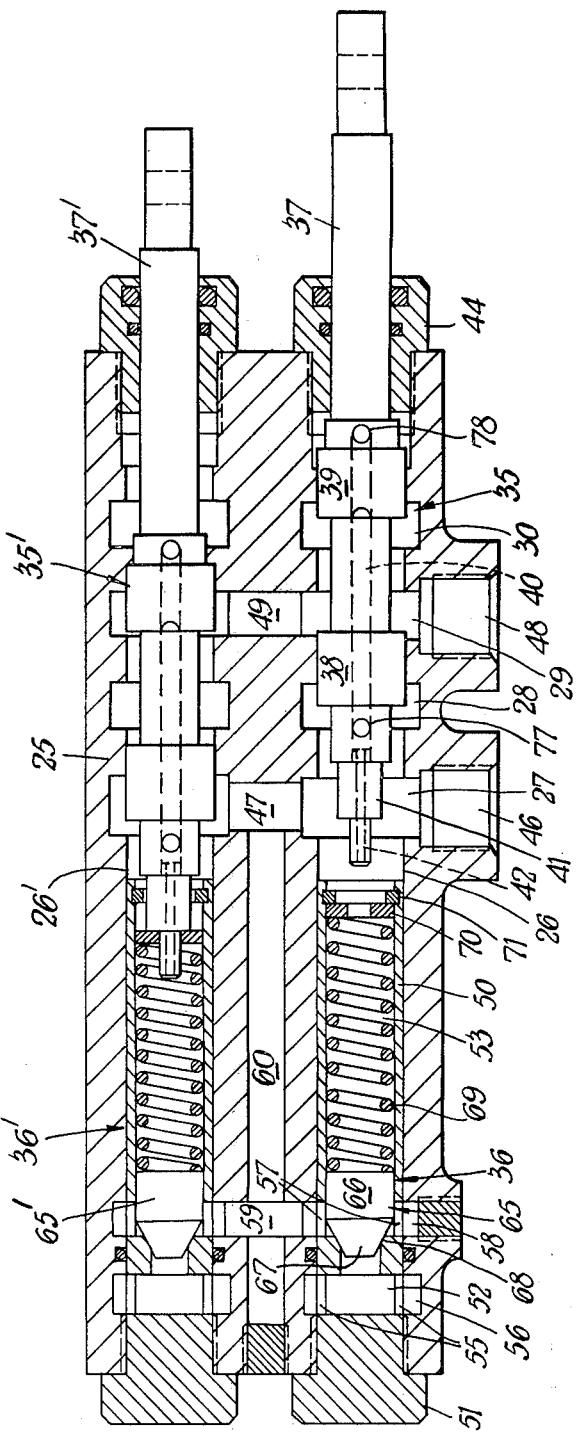
FIG. 4 is a similar cross-sectional view to that shown in FIG. 2 showing a different operating condition of the control assembly.

Both the clutch cylinders and both the brake cylinders are controlled from a control assembly which is shown in detail in FIGS. 2 to 4 of the accompanying drawings and is indicated generally by the reference numeral 17. Hydraulic fluid is fed into the control assembly along a conduit 11 from a source of fludi pressure 20.

Each brake cylinder 16 and 16' is a double-acting hydraulic piston-and-cylinder device. The piston rod-, or upper-, side of the piston of each brake cylinder 16 and 16' is connected by a conduit, 18 and 18', respectively, to the source of fluid pressure 20, and each of the piston head, or lower, sides of the pistons of the brake cylinders are respectively connected to outlet ports 75 and 75' of the control assembly 17 by conduit 21 and 21'.

Each clutch cylinder is also a double-acting hydraulic piston-and-cylinder device and both sides of each piston are connected to respective outlet ports 75, 76, 75' and 76' in the control assembly 17 by conduits 22, 23, 22' and 23'. the conduits 22 and 22' being joined to the conduits 21 and 21' which connect the outlet ports 75 and 75' of the control assembly 17 to the brake cylinders. It will be appreciated that, because the piston head sides of the brake and clutch cylinders associated with each of the tracks 1 and 1' are connected to the same respective outlets ports of the control assembly, hydraulic fluid will be supplied from the control assembly to the piston heads sides of the clutch and brake cylinders assoicated with respective tracks at the same pressure.

The pistons of the brake and clutch cylinders are connected to respective brake and clutch operating levers (not shown), and movement of the piston of the cylinders 15' and 16' to the right, as shown in the drawings, respectively effect disengagement of the clutch 8' against the bias of the springs of the clutch, and engagement of the brake 10'. Movement of the pistons of the cylinders 15' and 16' to the left respectively effect engagement of the clutch 8' and disengagement of the brake 10'. The concerted effect of the hydraulic pressure and the bias of the springs of the clutch ensures a smooth and speedy engagement of the clutch 8'. In the same manner, movement of the pistons of the cylinders 15 and 16 to the left, as shown in the drawings, respectively effects disengagement of the clutch 8 against the bias of the its springs and engagement of the brake 10 and movement of these pistons to the right effects smooth engagement of the clutch 8 and the disengagement of the brake 10. The brake cylinders 16 and 16' are constructed so that the pistons in the cylinders are balanced by the application of the full pressure of the pump 20 to the rod side, e.g. 240 psi, and the application of a lower pressure, e.g. 150 psi, to the piston head side. This is achieved in the arrangement illustrated in the drawings by incorporating differential pistons in the brake cylinders, the effective surface area of the piston rod side being smaller than that of the piston head side.

Figure 5:
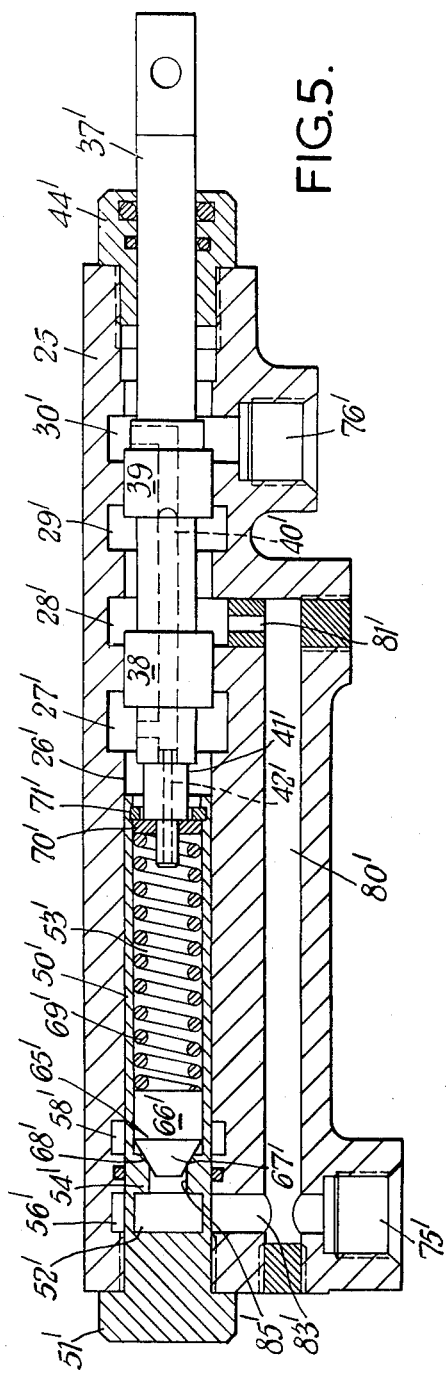
FIG. 5 is a longitudinal cross-section along the line AA of FIG. 3.
Figure 6:
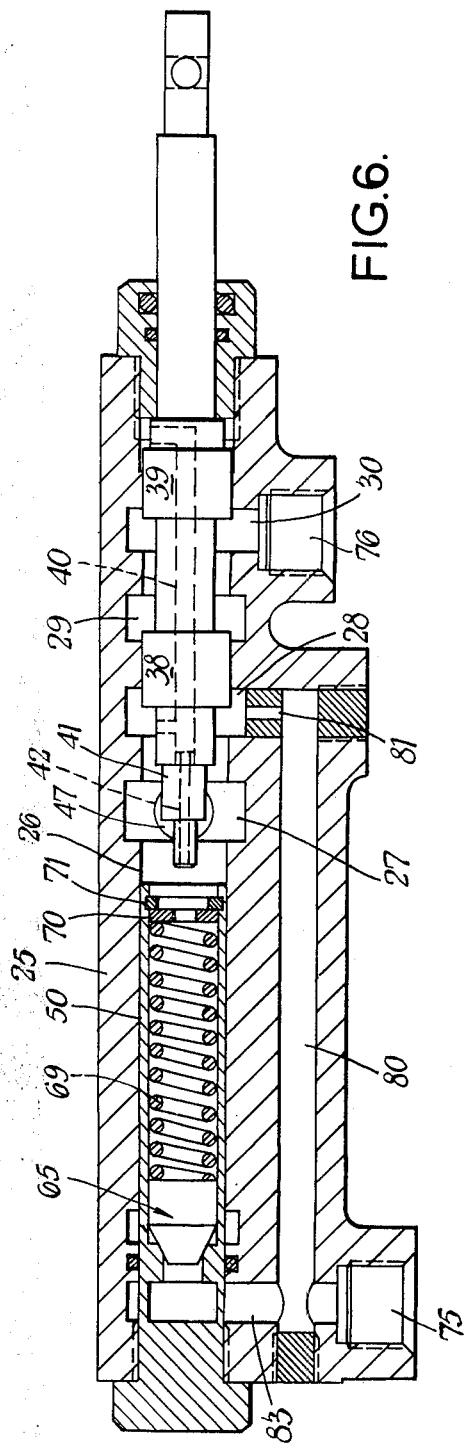
FIG. 6 is a longitudinal cross-section along the line BB of FIG. 3.

Turning now to FIGS. 3 to 5, these figures illustrate the construction of the control assembly in detail. The control assembly 17 comprises a housing 25 within which are located a pair of spool valves indicated generally by the reference numerals 35 and 35' and a pair of variable relief valves indicated generally by the reference numerals 36 and 36'. The housing 25 includes an exhaust port 46 which is connected to a sump by a conduit 12, a supply port 48 which is connected to the source of fluid pressure 20 by the conduit 11, and four outlet ports 75, 76, 75' and 76', as best illustrated in FIGS. 5 and 6. The outlet ports 75 and 76 are associated with the spool valve 35 and direct hydraulic fluid from the control assembly 17 into conduits 21 and 23, respectively. Similarly, the outlets 75' and 76' are associated with the spool valve 35' and direct fluid from the control assembly 17 into the conduits 21' and 23'. The spool valve 35, therefore, controls the supply of hydraulic fluid to the clutch and brake cylinders 15 and 16, and the spool valve 35' controls the supply to the cylinders 15' and 16'.

The spool valve 35 and variable relief valve 36 are located within a longitudinally extending bore 26 (see FIG. 4) in the housing, and the spool valve 35' and variable relief valve 36' within a bore 26' (see FIG. 3) which extends parallel to the bore 26. The right hand portions of the bores 26 and 26', as shown in the drawings, are each provided with four enlarged annular portions 27, 28, 29 and 30, and 27'28', 29' and 30'.

The exhaust port 46 communicates with the enlarged annular portion 27 of the internal bore 26 and, via an internal bore 47 in the housing, with enlarged annular portion 27' of the internal bore 26'. The supply port 48 communicates with the enlarged annular portion 29 of the internal bore 26 and, via an internal bore 49 in the housing, with the enlarged annular portion 29' of the bore 26'.

As best seen in FIG. 6, the enlarged annular portion 30 of the bore 26 comminicates with the outlet port 76 and the enlarged annular portion 28 comminicates with the other outlet port 75 via a passage 80 which extends through the housing immediately beneath the bore 26. A metering orifice 81 is located in the passage 80 and controls the flow of fluid between the enlarged annular portion 28 and the outlet 75.

The constructions of the spool valves and two relief valves are identical and, therefore, the construction of only the spool valve 35 and variable relief valve 36 will be described in detail. The corresponding parts in the spool valve 35' and variable relief valve 36' having been identified by corresponding primed reference numerals.

Referring to FIG. 4, a spool 37 is located within the right hand portion of the longitudinal bore 26 and is retained in the housing by a threaded end cap 44. The spool 37 is provided with two enlarged annular lands 38 and 39, and an internal bore 40. Two ports 77 and 78 effect communication of the internal bore 40 with the external surface of the spool 37 immediately adjacent the lands 38 and 39, respectively. An extension 41 is located on the internal end of the spool 37 and this extension is also provided with an internal bore 42 which communicates with the internal bore of the spool 37. The end portion of the extension 41 is of smaller diameter than the remainder of the extension 41.

The other end portion of the spool 37 is adapted for attachment to a control lever 43, as indicated diagrammatically in FIG. 2 of the accompanying drawings. This control lever 43 can be moved by an operator to shift the spool 37 in the bore 26 in the housing and thereby operate the spool valve 35.

Each spool 37 and 37' is reciprocable in the housing between three positions. The spool 37 is illustrated in the first or fully retracted position in FIGS. 3 and 6 of the drawings. Spool 37' is illustrated in the second position in FIGS. 3 and 5 of the drawings and the spool 37' is illustrated in the third position in FIG. 4 of the drawings.

Referring to FIG. 4, the variable relief valve 36 is located in the left hand portion of the longitudinal bore 26, as shown in the drawings, and comprises a cylindrical sleeve 50 which is closed at one end. The closed end is formed into a cap 51 which is threaded into the left hand end of the bore 26, as shown in the drawings. The sleeve 50 is divided into two chambers 52 and 53 by an annular wall 54 (see FIG. 3) which defines a central aperture 85 (see FIG. 3) which interconnects the chambers 52 and 53. The edge of the aperture 85 nearer the chamber 53 is bevelled to form a valve seat 68. Two ports 55 in the circumferential wall of the chamber 52 effect communication between the chamber 52 and an enlarged annular portion 56 in the internal bore 26 of the housing. A further two ports 57 effect communication between the chamber 53 and a further enlarged annular portion 58 in the internal bore 26. The further enlarged annular portion 58 is connected to the corresponding enlarged annular portion 58' in the bore 26' in the housing by a passage 59 and this passage 59 is itself connected by a common return gallery 60 to the exhaust port 46 via the internal bore 47 and the enlarged annular portion 27. The enlarged annular portion 56 is connected to the bore 80 in the housing via passage 83 (see FIG. 6).

The variable relief valve 36 includes a valve member 65 which has a body 66 of similar diameter to the internal diameter of the cylindrical sleeve 50 and a frustoconical head 67 which projects into the central aperture 85 and abuts against the valve seat 68 in order to seal the aperture 85. The valve member 65 is biased into sealing engagement with the central aperture 85 by a compression spring 69 which controls the variable relief valve. The compression spring acts between the body 66 and a washer 70 which is slidable within the chamber 53 and is retained within the chamber 53 by a circlip 71. The chamber 53 is connected to the exhaust port 46 via the annular portion 27. The corresponding chamber 53' of the variable relief valve 36' is connected to the exhaust port 46' via chamber 27' in bore 26', the bore 47 in the housing and the annular portion 27 of the bore 26.

The operation of the steering system of the track-laying vehicle illustrated in the drawing will now be described. When the system is operating, the pump 20 delivers hydraulic fluid at a pressure of 240 lbs per square inch along conduit 11 to the supply port 48 of the control assembly 17 and along conduits 18 and 18' to the piston rod sides of the pistons in the brake cylinders 16 and 16'. When it is desired to move the vehicle straight ahead, both spools 37 and 37' are withdrawn from the housing 25 by the control levers 43 and 43' into their respective first positions. This position is illustrated for the spool 37 in FIGS. 3 and 6. In this position of the spool 37, the supply port 48 is connected to the outlet port 76 via the enlarged annular portions 29 and 30 of the bore 26 in the housing 25, and the outlet port 75 is connected to the exhaust port 46 via the bore 80, the metering orifice 81 and the enlarged annular portions 28 and 27 in the internal bore 26. As a result, an hydraulic fluid pressure of 240 psi is applied to the rod sides of the pistons of the brake and clutch cylinders 15 and 16 whilst the head sides are connected by conduits 21 and 22, the control assembly 17, and conduit 12 to the sump. The pistons in the clutch and brake cylinders 15 and 16 will, therefore, be moved to the right, as shown in FIG. 2, so that the brake 10 is disengaged and the clutch 8 is engaged. Similarly, when the spool valve 35' occupies its first position, the clutch 8' will be engaged and the brake 10' will be disengaged. The power from the engine is, therefore, transmitted to both the drive sprockets 2 and 2'. The drive sprockets are therefore rotated at equal speeds and the vehicle moves forward in a straight line, in the direction indicated by the arrow F in FIG. 1.

If it is desired to turn the vehicle to the right, as shown in FIG. 1, the spool 37' is moved from its first position into its second position. This position is illustrated in FIGS. 3 and 5. In this position of the spool 37', the end portion of the extension 41' projects through the aperture in the washer 70', but the washer 70' is still in contact with the circlip 71'. Therefore, the compression spring 69' is still exerting the same force on the valve member 66' as it did when the spool 37' occupied the first position. However, the enlarged land 38' now prevents communication between the enlarged annular portions 27' and 28' in the internal bore 26', but allows the communication between the annular portions 28' and 29', and the land 39' now prevents communication between the annular portions 29' and 30'.

As a result, the outlet port 76' is now connected via the enlarged portion 30', the internal bore 40' in the spool 37', the enlarged annular portion 27', the passage 47 and the enlarged annular portion 27 in the bore 26, with the exhaust port 46. In addition, the outlet port 75' is connected with the supply port 48 via the bore 80', the metering orifice 81', the enlarged annular portions 28' and 29' in the bore 26', the passage 49 in the housing and the annular portion 29 in the bore 26. However, the outlet port 75' is also connected to the exhaust port via the variable relief valve 36'. Thus, fluid can flow from the outlet port 75' along the passage 83' into the annular portion 56' in the bore 26', through the ports 55' in the cylindrical sleeve 50' and into the chamber 52'. Fluid pressure in this chamber tends to unseat the valve member 65' against the bias of the compression spring 69'. The value of the compression spring is so chosen that, when the spring 69' is at its maximum extension, which occurs when the spring 69' is at its maximum extension, which occurs when the spool occupies its second position, the valve member 65' will be unseated at pressures in excess of 150 psi. Consequently, when the spool 37' occupies the second position, the maximum pressure of hydraulic fluid which is developed at the outlet port 75' is 150 psi. The excess fluid is vented by the variable relief valve to the exhaust port 46 via the enlarged annular portion 57' in the internal bore 26, the passage 59 and the common return gallery 60.

When the spool 37' occupies the second position, therefore, a pressure of 150 psi is transmitted from the outlet port 75' to the head sides of the pistons of the brake and clutch cylinders 16' and 15'. The rod side of the clutch cylinder is connected to the outlet port 76' which, in turn is connected to the sump by the control assembly 17 and the conduit 12. Consequently the piston in the clutch cylinder 15' is moved to the right, as shown in FIG. 2, which causes the clutch to disengage against the bias of its springs. However, the pressure of 150 psi applied to the head side of the brake cylinder 16' is sufficient only to balance the effect of the pressure of 240 psi which is applied to the rod side of the piston and consequently, the brake remains disengaged.

As a result of the disengagement of the clutch 8', power is no longer transmitted from the engine 3 to the drive wheel 2' and the drive wheel 2', therefore, idles. Consequently, the vehicle turns in a gentle curve to the right, as shown in FIG. 1.

If it is desired to turn the vehicle to the right in a sharper curve, the spool 37' is moved from its second position towards its third position. The third position of the spool 37' is illustrated in FIG. 4 of the drawings. As the spool 37' moves towards the third position from the second position, the outlet port 76' is still connected with the exhaust port 46, and the outlet port 75' is still connected with the supply port 48, and, via the relief valve 36', with the exhaust port 46 as when the spool 37' occupied its second position. However, the larger diameter portion of the extension 41' of the spool 37' engages the washer 70' and, as the spool 37' is moved towards the third position, the washer 70' is moved along the sleeve 50' towards the valve member 65' of the variable relief valve 36'. The compression of the spring 69' is, therefore, increased during the movement of the spool 37' from the second to the third position. As a result the pressure at which the variable relief valve 36' effects communication of the outlet port 75' with the exhaust port is increased as the spool 37' is moved towards the third position. The pressure of fluid which is applied to the head end of the cylinder in the piston in the brake cylinder 16' is, therefore, increased above the 150 psi which was applied when the spool 37' occupied its second position. The net force on the head side of the piston of the brake cylinder 16' now becomes greater than the net force exerted on the rod side of the brake cylinder by the pump 20, and the piston is moved to the right, as shown in FIG. 2 of the drawings. The brake is, therefore, engaged, the force exerted on the brake being proportional to the net force exerted on the piston of the brake cylinder 16'. The increased pressure at the outlet 75' is also applied to the head side of the piston in the clutch cylinder 15' but the effect of this pressure is to retain the clutch in its disengaged position.

When the spool 37' is moved into the third position, which is illustrated in FIG. 3, the compression spring 69' is at its highest compression and is, therefore, exerting the highest force on the valve member 65'. The highest pressure is, therefore, developed at the outlet port 75' and on the head side of the piston of the brake cylinder 16'. Thus, when the spool 37' occupies the third pisition, the clutch 8' is still disengaged but the brake 10' is fully engaged.

The movement of the spool valve 35' from the second to the third position, therefore, increases progressively the pressure at which relief of hydraulic fluid supplied to the brake cylinder 16' from the control assembly is permitted so that the brake is progressively engaged during movement of the spool valve from the second position to the third position. By selecting an appropriate position of the spool valve 35' which corresponds to a desired brake pressure on the brake 10', the drive wheel 2' can be braked with a desired force.

Consequently, the vehicle can be made to turn in a sharper curve.

When the spool valve 35' occupies the second or third position or any position therebetween, hydraulic fluid is supplied from the supply port 48 of the control assembly to the brake cylinder 16' and, via the relief valve 36', to the exhaust port 46, through the metering orifice 81'. This metering orifice prevents any sudden and large flow of fluid to exhaust which would provide an excessive drain of hydraulic fluid in the hydraulic system of the vehicle. The possibility of "starvation" of any other hydraulic circuits in the crawler vehicle is thereby reduced. Additionally, the metering orifice prevents sudden flows of fluid into the brake and clutch cylinders and therefore ensures that the brake and clutch are engaged or disengaged smoothly.

If it is desired to turn the vehicle to the left, as shown in FIG. 1, the spool valve 35' is returned to its first position and the spool valve 35 is moved from the first position to the second position so that the clutch 10 is disengaged whilst the clutch 10' is engaged in a manner similar to that described for the operation of the clutch 8' and brake 10'. By moving the spool valve 35 from the second position into the third position, the brake 10 can be applied progressively, thereby braking the drive wheel 2 with progressively increasing force. The vehicle can thus be turned to the left in sharper curves in the same manner that the vehicle can be turned to the right by operation of the spool valve 35'.

In the embodiment of the invention described in the drawings, both the spool valves and both the variable relief valves are located in a single housing 25 and the variable relief valves operate to direct fluid into the common return gallery 60 in the housing. The control assembly is therefore compact and the control levers which operate the spool valves are arranged next to each other in a convenient position for an operator.

The hydraulic control system for the track-laying vehicle which has been described above with reference to the accompanying drawings is a closed centre type hydraulic system. Consequently, the system does not have an operating condition in which fluid is being circulated through the system from the source of fluid pressure to the sump, as is encountered in hydraulic systems of the open-centre type. As a result, the system does not require its own source of fluid pressure, and can easily be added on to the existing hydraulic circuits conventionally included in track-laying vehicles. In addition, the control assembly itself is of simple and straightforward design, including only a very few moving parts, and is very compact.

I claim:

1. A track-laying vehicle comprising a pair of tracks, a pair of drive wheels each driving a respective one of the tracks, a pair of clutches each for transmitting power to a respective one of the drive wheels, clutch cylinders for operating the clutches, a pair of brakes each for braking a respective one of the tracks, brake cylinders for operating the brakes, a source of hydraulic fluid pressure, and a control assembly for controlling the supply of fluid to said clutch and brake cylinders, said hydraulic pressure source having a first supply line connecting same to the clutch and brake cylinders associated with a respective one of the tracks, and a second supply line connecting said source to the clutch and brake cylinders associated with the other of the tracks, said control assembly including a pair of spool valves and a pair of variable relief valves, said assembly arranged with a first of the said spool valves in the first supply line for controlling the supply of hydraulic fluid to the clutch and brake cylinders concerned, and a second of the said spool valves in the second supply line for controlling the supply of hydraulic fluid to the clutch and brake cylinders concerned, each spool valve having three operating positions: a first position in which the brake is disengaged, a second position in which the clutch is disengaged and the brake is disengaged, and a third position in which the clutch is disengaged and the brake is engaged, said assembly further arranged with a first of the said variable relief valves in the first supply line and a second of the said variable relief valves in the second supply line, said variable relief valves each having tensioned biasing means controlling the pressure at which each relief valve permits relief of the hydraulic fluid pressure in the different ones of the supply lines, the tensioned biasing means of each variable relief valve being associated with one spool valve, so that movement between certain positions thereof causes increased tensioning of the biasing means and increasing pressure at which said relief of hydraulic fluid pressure is permitted, each variable relief valve being controlled by the associated tensioned biasing means for permitting relief of hydraulic fluid pressure supplied to a respective brake cylinder from said control assembly when the associated spool valve is in the second position, and each variable relief valve being controlled during the movement of the associated spool valve from the second to the third position to increase progressively the pressure at which the said relief of hydraulic fluid pressure is permitted, whereby the brake is progressively engaged during movement of the spool valve from the second position to the third position.

2. A vehicle according to claim 1 wherein, when the spool valve is in the second or third position, or any position therebetween, hydraulic fluid is supplied from the control assembly to the clutch cylinder and the brake cylinder at the same pressure.

3. A vehicle according to claim 1 wherein each brake cylinder is a double-acting hydraulic piston-and-cylinder device, one side of each piston being connected to the source of fluid pressure, the other side being connected to the control assembly.

4. A vehicle according to claim 1 wherein each clutch cylinder includes a double-acting hydraulic piston-and-cylinder device both sides of the pistons of which are connected to the control assembly.

5. A vehicle according to claim 1 including means defining a metering orifice through which fluid is supplied from the control assembly to the brake cylinder when each spool valve occupies the second or third position or any position therebetween.

6. A vehicle according to claim 1 wherein both the spool valves and both the variable relief valves are located in a single housing and the variable relief valves operate to direct fluid into a common return gallery in the housing.

7. A track-laying vehicle comprising a pair of tracks, a pair of drive wheels each driving a respective one of the tracks, a pair of clutches each for transmitting power to a respective one of the drive wheels, clutch cylinders for operating the clutches, a pair of brakes each for braking a respective one of the tracks, brake cylinders for operating the brakes, a source of fluid pressure, and a control assembly for controlling the supply of fluid to said clutch and brake cylinders, said control assembly including a pair of spool valves and a pair of variable relief valves, each spool valve controlling the supply of hydraulic fluid to the clutch and brake cylinders associated with a respective one of the tracks, each spool valve having three operating position: a first position in which the brake is disengaged and the clutch is engaged, a second position in which the clutch is disengaged and the brake is disengaged, and a third position in which the clutch is disengaged and the brake is fully engaged, each variable relief valve being associated with one spool valve, and permitting relief of hydraulic fluid supplied to a respective brake cylinder from said control assembly when the associated spool valve is in the second position, and each variable relief valve being controlled during the movement of the associated spool valve from the second to the third position to increase progressively the pressure at which the said relief of hydraulic fluid is permitted, whereby the brake is progressively engaged during movement of the spool valve from the second position to the third position, said control assembly further including a pair of compression springs, arranged wherein a compression spring controls each variable relief valve, the compression of the spring being increased by the associated spool valve during the movement of the spool valve between the second and third positions.

* * * * *